United States Patent
Jung et al.

(10) Patent No.: US 9,791,734 B2
(45) Date of Patent: Oct. 17, 2017

(54) MODULE FOR LIQUID CRYSTAL DISPLAY APPARATUS AND LIQUID CRYSTAL DISPLAY APPARATUS COMPRISING THE SAME

(71) Applicant: SAMSUNG SDI CO., LTD., Yongin-si, Gyeonggi-do (KR)

(72) Inventors: Yeon Ju Jung, Uiwang-si (KR); Ae Kyoung Kim, Uiwang-si (KR); Han Su Kim, Uiwang-si (KR); Kwang Ho Shin, Uiwang-si (KR); Dong Yoon Shin, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 53 days.

(21) Appl. No.: 14/797,060

(22) Filed: Jul. 10, 2015

(65) Prior Publication Data

US 2016/0026022 A1 Jan. 28, 2016

(30) Foreign Application Priority Data

Jul. 24, 2014 (KR) .......................... 10-2014-0094236

(51) Int. Cl.
*G02F 1/1335* (2006.01)
*G02F 1/13363* (2006.01)

(52) U.S. Cl.
CPC .. *G02F 1/133528* (2013.01); *G02F 1/133634* (2013.01); *G02F 2001/133631* (2013.01); *G02F 2001/133635* (2013.01)

(58) Field of Classification Search
CPC ......... G02F 1/133528; G02F 1/133634; G02F 1/13363; G02F 1/133632; G02F 2413/01;
(Continued)

(56) References Cited

U.S. PATENT DOCUMENTS

| 6,567,143 B1 * | 5/2003 | VanderPloeg ..... G02F 1/133632 349/118 |
| 2007/0064168 A1 | 3/2007 | Shiraogawa et al. |

(Continued)

FOREIGN PATENT DOCUMENTS

| JP | 2005-128219 A | 5/2005 |
| JP | 2008-521056 A | 6/2008 |

(Continued)

OTHER PUBLICATIONS

KIPO Office action dated Jul. 16, 2015 from priority Application No. KR 10-2014-0094236, 5 pages, English portions only.

(Continued)

*Primary Examiner* — Angela Davison
(74) *Attorney, Agent, or Firm* — Lewis Roca Rothgerber Christie LLP

(57) ABSTRACT

An LCD module includes an LCD panel, and a polarizing plate formed on each of the upper and lower surfaces of the LCD panel. The polarizing plate includes a polarizer and a polyester film formed on at least one surface of the polarizer. The polyester film has a difference between the index of refraction in the x-axis direction and the index of refraction in the z-axis direction (nx−nz) of about 0.1 to about 0.18, where nx and nz are the indices of refraction in the x-axis and z-axis directions, respectively, at a wavelength of 550 nm. The LCD module has a CR 45° and a CR 135° of about 1.0% or greater.

12 Claims, 1 Drawing Sheet

(58) Field of Classification Search
CPC ............ G02F 2413/02; G02F 2413/04; G02F 2413/08; G02F 2413/10; G02F 2413/12; G02F 2001/133631; G02F 2001/133635; G02F 2001/133632; G02F 2001/13363; G02F 2413/06; G02F 2413/09; G05B 5/3083; G05B 5/32
USPC ...................... 349/121, 117–119; 359/489.07
See application file for complete search history.

(56) References Cited

U.S. PATENT DOCUMENTS

2010/0026936 A1* 2/2010 Uesaka ................ G02B 5/3033
349/75
2013/0162930 A1* 6/2013 Shin .................... G02F 1/13362
349/62

FOREIGN PATENT DOCUMENTS

| JP | 4247894 B2 | 4/2009 |
| JP | 4575978 B2 | 11/2010 |
| KR | 10-2009-0080133 A | 7/2009 |
| KR | 10-1397702 B1 | 5/2014 |
| TW | 201017236 A | 5/2010 |

OTHER PUBLICATIONS

Taiwan Office action dated Nov. 3, 2016, corresponding to Taiwanese Patent Application No. 104123997 (3 pages).

\* cited by examiner

MODULE FOR LIQUID CRYSTAL DISPLAY APPARATUS AND LIQUID CRYSTAL DISPLAY APPARATUS COMPRISING THE SAME

CROSS-REFERENCE TO RELATED APPLICATION

This application claims priority to and the benefit of Korean Patent Application No. 10-2014-0094236, filed on Jul. 24, 2014 in the Korean Intellectual Property Office, the entire content of which is incorporated herein by reference.

BACKGROUND

1. Technical Field

Embodiments of the present invention relate to liquid crystal display modules and to liquid crystal displays including the same.

2. Description of the Related Art

A liquid crystal display (LCD) includes an LCD module and a backlight unit. The LCD module includes an LCD panel and polarizing plates formed on both surfaces of the LCD panel. The contrast ratio of the LCD panel can vary depending upon viewing angle due to the alignment of liquid crystals. The LCD panel has a high contrast ratio at a front side thereof and a low contrast ratio at a lateral side thereof.

The polarizing plate includes a polarizer and a protective film formed on both surfaces of the polarizer. A retardation film may be used as a protective film, and may be formed between the polarizer and the LCD panel to compensate for viewing angle at the lateral side of the LCD panel by increasing the contrast ratio at the lateral side thereof. However, the retardation film has limited effect in widening the viewing angle at the lateral side.

Therefore, there is a need for an LCD module with improved compensation for lateral contrast ratio and lateral viewing angle while at the same time reducing the difference in brightness at both sides thereof.

SUMMARY

According to embodiments of the present invention, a liquid crystal display (LCD) module includes an LCD panel and a polarizing plate formed on each of the upper and lower surfaces of the LCD panel. The polarizing plate includes a polarizer and a polyester film formed on at least one surface of the polarizer. The polyester film has a difference in the indices of refraction in the x-axis and z-axis directions (i.e., $nx-nz$) of about 0.1 to about 0.18 (where $nx$ and $nz$ are the indices of refraction in the x-axis and z-axis directions, respectively, at a wavelength of 550 nm). The LCD module has a CR 45° and a CR 135° of about 1.0% or greater, as calculated using Equations 1 and 2, respectively.

$$CR\ 45°=A/B\times100 \qquad (1)$$

In Equation 1, A is the brightness value measured at a viewing angle of 45°/60° using the LCD module, and B is the brightness value measured at a viewing angle of 0°/0° using the LCD module.

$$CR\ 135°=C/B\times100 \qquad (2)$$

In Equation 2, B is the brightness value measured at a viewing angle of 0°/0° using the LCD module, and C is the brightness value measured at a viewing angle of 135°/60° using the LCD module.

The LCD panel may include a liquid crystal layer including liquid crystals aligned in a vertical alignment (VA) mode.

An absolute value ($|C-A|$) of the difference between C and A may be about 5 or less.

An absolute value ($|CR\ 135°-CR\ 45°|$) of the difference between CR 135° and CR 45° may be about 0.1% or less.

The polyester film may have a difference in the indices of refraction in the x-axis and y-axis directions (i.e., $nx-ny$) of about 0.01 to about 0.1 (where $nx$ and $ny$ are the indices of refraction in the x-axis and y-axis directions, respectively, at a wavelength of 550 nm).

The polyester film may have a difference in the indices of refraction in the y-axis and z-axis directions (i.e., $ny-nz$) of about 0.01 to about 0.1 (where $ny$ and $nz$ are the indices of refraction in the y-axis and z-axis directions, respectively, at a wavelength of 550 nm).

The polyester film may have an in-plane retardation at a wavelength of 550 nm of about 5,000 nm to about 15,000 nm.

The polyester film may have a degree of biaxiality (NZ) of about 1.8 or less, as calculated by Equation 3.

$$NZ=(nx-nz)/(nx-ny) \qquad (3)$$

In Equation 3, $nx$, $ny$ and $nz$ are the indices of refraction at a wavelength of about 550 nm in the x-, y- and z-axis directions of the polyester film, respectively.

The polarizing plate may further include an optical film formed on the other surface of the polarizer.

The optical film may have an in-plane retardation (Ro) at a wavelength of 550 nm of about 20 nm to about 100 nm.

The optical film may have a thickness direction retardation (Rth) at a wavelength of 550 nm of about 50 nm to about 300 nm, as calculated by Equation 4.

$$Rth=((nx+ny)/2-nz)\times d \qquad (4)$$

In Equation 4, $nx$, $ny$ and $nz$ are the indices of refraction at a wavelength of about 550 nm in the x-, y- and z-axis directions of the optical film, respectively, and d is a thickness of the optical film in nanometers (nm).

According to embodiments of the present invention, a liquid crystal display includes the LCD module as set forth herein.

In some embodiments of the present invention, an LCD module has improved compensation for lateral contrast ratio and lateral viewing angle while at the same time reducing the difference in brightness at both lateral sides thereof. In some embodiments, a liquid crystal display includes the LCD module.

DETAILED DESCRIPTION

Figure 1:
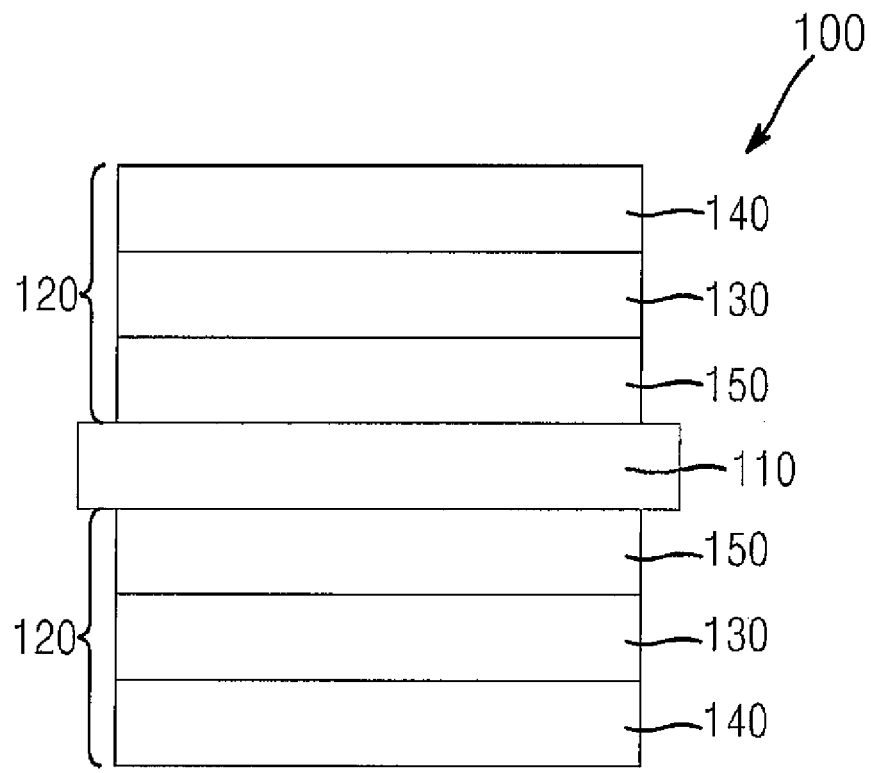
FIG. 1 is a schematic cross-sectional view of an LCD module according to embodiments of the present invention.

Embodiments of the present invention will be described with reference to the accompanying drawings. It should be understood that the present invention may be embodied in different ways and is not limited to the following embodiments. In the drawings, portions irrelevant to the description are omitted for clarity. Like components are denoted by like reference characters throughout the specification.

As used herein, directional terms such as "upper" and "lower," are defined with reference to the accompanying drawings. Thus, it will be understood that the term "upper surface" can be used interchangeably with the term "lower surface".

As used herein, the term "(meth)acryl" means acryl and/or methacryl.

As used herein, unless specified otherwise, the terms "nx", "ny", and "nz" refer to indices of refraction at a wavelength of 550 nm in the x-, y- and z-axis directions of a film, respectively. Additionally, the x-axis direction refers to the machine direction (MD) of the film, the y-axis direction refers to the transverse direction (TD) of the film, and the z-axis direction refers to the thickness direction of the film. The x-axis, the y-axis and the z-axis are orthogonal to each other.

As used herein, the "degree of biaxiality (NZ)" is calculated using Equation 3.

$$NZ=(nx-nz)/(nx-ny) \quad (3)$$

In Equation 3, nx, ny and nz are the indices of refraction at a wavelength of about 550 nm in the x-, y- and z-axis directions of the film, respectively.

As used herein, the "thickness direction retardation (Rth)" is calculated using Equation 4.

$$Rth=((nx+ny)/2-nz)\times d \quad (4)$$

In Equation 4, nx, ny and nz are the indices of refraction at a wavelength of about 550 nm in the x-, y- and z-axis directions of a film, respectively, and d is the thickness of the film in nanometers (nm).

As used herein, the term "stretching ratio" may refer to the ratio of the length of a film before stretching to the length of the film after stretching.

Figure 2:
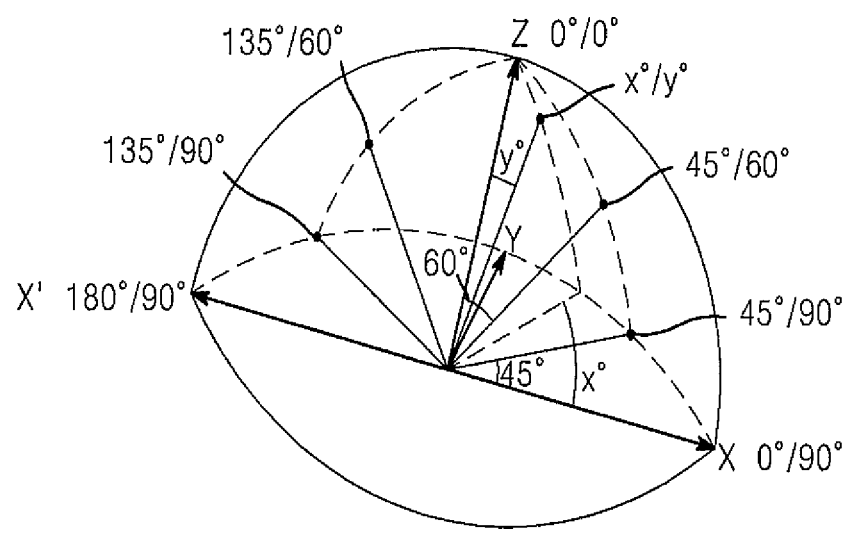
FIG. 2 is a conceptual view of the viewing angle x°/y° according to embodiments of the present invention.

The term "viewing angle x°/y°" is explained with reference to FIG. 2. In FIG. 2, a hemisphere having the X-axis/X'-axis, the Y-axis and the Z-axis is assumed, in which a screen of a liquid crystal display is present on a plane defined by the X-axis/X'-axis and the Y-axis. In the hemisphere assumed in FIG. 2, the "front side" refers to the side of the liquid crystal display when viewing the screen of the liquid crystal display in the Z-axis direction. The X-axis/X'-axis, the Y-axis and the Z-axis are orthogonal to each other. The term "viewing angle x°/y°" means a point defined by x° and y° in which x° is an angle from the X-axis to the Y-axis, and y° is an angle from the Z-axis to a plane defined by the X-axis and the Y-axis. When the X-axis is a 0-degree axis, the Y-axis is a 90-degree axis, and the X'-axis is a 180-degree axis in the plane defined by the X-axis/X'-axis and the Y-axis. For example, a "viewing angle 45°/160°" refers to a point at which an angle from the X-axis to the Y-axis is 45°, and an angle from the Z-axis to the plane defined by the X-axis/X-axis and the Y-axis is 60°. Also, a "viewing angle 135°/60°" refers to a point at which an angle from the X-axis to the X'-axis through the Y-axis is 135°, and an angle from the Z-axis to the plane defined by the X-axis/X'-axis and the Y-axis is 60°. Additionally, a "viewing angle 0°/0°" refers to a point on the Z-axis.

In embodiments of the invention, an LCD module includes an LCD panel and a polarizing plate formed on each of the upper and lower surfaces of the LCD panel. The polarizing plate includes a polarizer and a polyester film formed on at least one surface of the polarizer. The polyester film has a difference in the indices of refraction in the x-axis and z-axis directions (i.e., nx−nz) of about 0.1 to about 0.18 (where nx and nz are the indices of refraction in the x- and z-axis directions at a wavelength of 550 nm, respectively).

The LCD module has a CR 45° and a CR 135° of about 1.0% or greater, as calculated using Equations 1 and 2, respectively.

$$CR\ 45°=A/B\times 100 \quad (1)$$

In Equation 1, A is the brightness value measured at a viewing angle of 45°/60° using the LCD module, and B is the brightness value measured at a viewing angle of 0°/0° using the LCD module.

$$CR\ 135°=C/B\times 100 \quad (2)$$

In Equation 2, B is the brightness value measured at a viewing angle of 0°/0° using the LCD module, and C is the brightness value measured at a viewing angle of 135°/60° using the LCD module.

According to the definition of FIG. 2, the viewing angle 0°/0° indicates the front side of the LCD panel, and the viewing angles 45°/60° and 135°/60° indicate opposite sides of the LCD panel. Viewing angle brightness may be measured by any method known in the art after assembly of the LCD module and a backlight unit.

Since a liquid crystal display is configured to allow a viewer to see an image on a screen by guiding light emitted from the backlight unit to pass through the polarizing plate and the LCD panel, typical liquid crystal displays have high brightness in the front of the LCD panel and low brightness at the lateral sides of the LCD panel. This provides unevenness in brightness between the front side and the lateral sides of the LCD panel. Accordingly, it is desirable to increase the brightness at the lateral sides of the liquid crystal display, specifically the lateral brightness at viewing angles 45°/60° and 135°/60°. Particularly, increases in the screen size of liquid crystal displays can cause reductions in lateral brightness and severe brightness unevenness.

In the LCD modules according to embodiments of the present invention, the polarizing plate (including the polyester film having a difference in the indices of refraction (nx−nz) of about 0.1 to about 0.18 at a wavelength of 550 nm) is stacked on each of the upper and lower surfaces of the LCD panel. With this structure, the LCD panel has improved lateral brightness. Accordingly, the LCD module according to embodiments of the present invention allows a viewer to see a clear image at the lateral sides of the LCD panel, thereby improving the lateral contrast ratio while at the same time widening the lateral viewing angle. For example, in some embodiments, the LCD module has a CR 45° and a CR 135° of about 1.0% or greater, for example, about 1.0% to about 5.0%, as calculated by Equations 1 and 2, respectively. In these embodiments, a viewer can see a clear image at the lateral sides of the liquid crystal display.

In addition, the LCD module according to embodiments of the present invention can minimize the difference in brightness between opposite sides of the LCD panel. For example, in Equations 1 and 2, an absolute value (|C−A|) of the difference between C and A may be about 5 or less, for example, about 0.1 to about 5. Also, an absolute value (|CR 135°−CR 45°|) of the difference between CR 135° and CR 45° may be about 0.1% or less, for example, about 0.01% to about 0.1%. Within these ranges, the LCD module can minimize the difference in brightness between the opposite sides of the LCD panel such that a viewer cannot recognize a difference in brightness between the opposite sides thereof.

Next, an LCD module according to embodiments of the invention will be described with reference to FIG. 1. FIG. 1 is a schematic cross-sectional view of an LCD module according to embodiments of the present invention.

Referring to FIG. 1, an LCD module 100 includes an LCD panel 110 and a polarizing plate 120 formed on each of the upper and lower surfaces of the LCD panel 110. The polarizing plate 120 includes a polarizer 130, a polyester film 140 formed on one surface of the polarizer 130, and an optical film 150 formed on the other surface of the polarizer 130. The polyester film 140 may have a difference in the indices of refraction in the x-axis and z-axis directions (i.e., nx−nz) of about 0.1 to about 0.18 at a wavelength of 550 nm, and the LCD module 100 may have a CR 45° and a CR 135° of about 1.0% or more, as calculated using Equations 1 and 2, respectively.

In the LCD module 100, the polyester film (having the difference in the indices of refraction in the x-axis and z-axis directions (i.e., nx−nz) of about 0.1 to about 0.18 at a wavelength of 550 nm) (hereinafter, the polyester film) may be placed at the outermost layer of the LCD module. For example, referring to FIG. 1, the polyester films 140 may be placed on an upper surface of the polarizer 130 in the polarizing plate 120 formed on the upper surface of the LCD panel 110, and on a lower surface of the polarizer 130 in the polarizing plate 120 formed on the lower surface of the LCD panel 110, respectively.

Next, the components of the LCD module according to embodiments of the invention will be described.

The LCD panel 110 includes a panel that includes a liquid crystal cell layer embedded between a first substrate and a second substrate. In some embodiments, the first substrate may be a color filter (CF) substrate (upper substrate) and the second substrate may be a thin film transistor (TFT) substrate (lower substrate). In FIG. 1, the first substrate, the second substrate, and the liquid crystal cell layer are omitted for clarity and ease of understanding.

The first substrate and the second substrate may be formed of the same or different materials, and may be glass substrates or plastic substrates. The plastic substrates may be formed of any plastic material applicable to flexible displays, for example, polyethylene terephthalate (PET), polycarbonate (PC), polyimide (PI), polyethylene naphthalate (PEN), polyether sulfone (PES), polyacrylate (PAR), and cycloolefin copolymers (COCs), but the plastic substrates are not limited thereto. The liquid crystal cell layer may include liquid crystal cells arranged in a mode selected from among a vertical alignment (VA) mode, an in-place switching (IPS) mode, a fringe field switching (FFS) mode, and a twisted nematic (TN) mode. For example, the liquid crystal cell layer may include liquid crystal cells arranged in a vertical alignment mode.

The polarizer 130 has a specific direction of molecular alignment. In the liquid crystal display, the polarizer 130 allows transmission of light travelling in a specific direction therethrough. The polarizer 130 may be fabricated by dyeing a polyvinyl alcohol film with iodine or a dichroic dye, followed by stretching the polyvinyl alcohol film in a specific direction.

In some embodiments, the polarizer may be fabricated by a method including dipping a polyvinyl alcohol film in a dyeing bath containing iodine to prepare a dyed polyvinyl alcohol film, and stretching the dyed polyvinyl alcohol film in a stretching bath containing boric acid.

The polyvinyl alcohol film may be formed of any suitable polyvinyl alcohol resin, and may have a degree of polymerization of about 2000 to about 3000, a degree of saponification of about 90% to about 100%, and a thickness of about 50 μm to about 200 μm.

The polyvinyl alcohol film may be subjected to a swelling process before dipping in the dyeing bath. The swelling process may be performed in a swelling bath containing an aqueous solution at a temperature of about 22° C. to about 32° C. Through this process, it is possible to remove foreign matter from the surface of the polyvinyl alcohol film or to ensure efficient dyeing. The swollen polyvinyl alcohol film may be subjected to stretching before dipping in the dyeing bath to ensure efficient dyeing. Here, stretching may be performed by at least one of dry stretching and/or wet stretching. Dry stretching may be performed at temperature of about 20° C. to about 40° C., and wet stretching may be performed in an aqueous solution at a temperature of about 20° C. to about 40° C. The polyvinyl alcohol film may be stretched to a degree sufficient to provide a stretching ratio of about 2 to about 5 by MD uniaxial stretching.

To dye the polyvinyl alcohol film in the dyeing bath, the dyeing bath may include an aqueous solution in which iodine is present in an amount of about 0.01 wt % to about 5.0 wt %. Optionally, the aqueous solution in the dyeing bath may further contain about 2.5 wt % or less of potassium iodide. The dyeing bath may have a temperature of about 20° C. to about 50° C. The polyvinyl alcohol film may be dyed by dipping the polyvinyl alcohol film in the dyeing bath for about 2 minutes to about 4 minutes.

Before stretching the polyvinyl alcohol film, the polyvinyl alcohol film may be subjected to crosslinking in a crosslinking bath that contains boric acid and potassium iodide. The crosslinking bath may include an aqueous solution in which boric acid is present in an amount of about 0.1 wt % to about 5.0 wt %, and potassium iodide is optionally present in an amount of about 5.0 wt % or less. In addition, the crosslinking bath may have a temperature of about 30° C. to about 55° C. Crosslinking may be performed for about 1 minute to about 2 minutes.

The dyed and/or crosslinked polyvinyl alcohol film may be subjected to stretching in a stretching solution (or bath) containing boric acid. The stretching bath may include an aqueous solution in which boric acid is present in an amount of about 2.5 wt % to about 5.0 wt %. Further, the aqueous solution in the stretching bath may further include about 1.0 wt % to about 5.0 wt % of potassium iodide. The stretching bath may have a temperature of about 54° C. to about 58° C. In the stretching bath, the polyvinyl alcohol film may be stretched to a degree sufficient to provide a stretching ratio of about 2.0 to about 4.0 by MD uniaxial stretching.

The stretched polyvinyl alcohol film may be dipped in a color complementing bath containing boric acid and potassium iodide. With such a dip, it is possible to fabricate a polarizer that is subjected to less color variation and that is free from spots (or has a reduced number of spots). The color complementing bath may contain an aqueous solution in which boric acid is present in an amount of about 0.8 wt % to about 1.2 wt %, and potassium iodide is present in an amount of about 3.6 wt % to about 4.0 wt %. The color complementing bath may have a temperature of about 30° C. to about 55° C. Dipping in the color complementing bath may be performed for about 1 minute to about 2 minutes.

In fabricating the polarizer, the polyvinyl alcohol film may be stretched to a final stretching ratio of about 5 times to about 7 times, for example, about 5.5 times to about 6.5 times, an initial length thereof.

The polarizer 130 may have a thickness of about 5 μm to about 30 μm, for example, about 20 μm to about 30 μm. Within these ranges, the polarizer may be used in a polarizing plate for a liquid crystal display.

The polyester film 140 may be formed on one surface of the polarizer 130 to protect the polarizer 130, and has a CR 45° and CR 135° of about 1.0% or greater (as calculated using Equations 1 and 2, respectively) to improve lateral contrast ratio and viewing angle.

The polyester film 140 may have a difference in the indices of refraction in the x-axis and z-axis directions (i.e., nx−nz) of about 0.1 to about 0.18, for example, about 0.11 to about 0.16. Within these ranges, the polyester film 140 can improve lateral brightness and lateral viewing angle, while at the same time minimizing uneven brightness between the front and lateral sides of the liquid crystal display.

The polyester film 140 may have a difference in the indices of refraction in the x-axis and y-axis directions (i.e., nx−ny) of about 0.01 to about 0.1, and a difference in the indices of refraction in the y-axis and z-axis directions (i.e., ny−nz) of about 0.01 to about 0.1. Within these ranges, the polyester film 140 can suppress rainbow spots.

The polyester film 140 may have an in-plane retardation (Ro) at a wavelength of 550 nm of about 5,000 nm to about 15,000 nm, for example, about 5,100 nm to about 12,000 nm, about 8,000 nm to about 11,000 nm, or about 5,100 nm to about 6,800 nm. Within any of these ranges, when used as a protective film for the polarizer, the polyester film can prevent generation of rainbow spots. In addition, the polyester film can suppress light leakage at the lateral sides of the polarizing plate and can prevent (or reduce) increases in the difference in retardation values by preventing (or reducing) variations of the retardation value depending upon the incident angle.

The polyester film 140 may have a degree of biaxiality (NZ) at a wavelength of 550 nm of about 1.8 or less, for example, about 1.0 to about 1.8. Within these ranges, the polyester film 140 can suppress generation of spots due to birefringence.

The polyester film 140 may have a thickness direction retardation (Rth) at a wavelength of 550 nm of about 15,000 nm or less, for example, about 10,000 nm to about 13,000 nm. Within these ranges, the polyester film 140 can suppress the generation of spots due to birefringence.

The polyester film 140 may have a thickness of about 25 μm to about 115 μm, for example, about 50 μm to about 100 μm. Within these ranges, the polyester film 140 may be applied to the polarizing plate when stacked on the polarizer.

The polyester film 140 may be any transparent film formed of a polyester resin, without limitation. For example, the polyester film may be formed of at least one resin selected from polyethylene terephthalate, polybutylene terephthalate, polyethylene naphthalate, and polybutylene naphthalate.

The polyester film 140 may be fabricated by stretching an extruded polyester resin to a stretching ratio of about 2 to about 10 times its initial length only in a transverse direction (TD), followed by thermal stabilization for tension-relaxation.

In some embodiments, the polyester film 140 may be fabricated by stretching the extruded polyester resin to a stretching ratio of about 2 to about 10 times its initial length only in the TD without MD stretching. The polyester film may have a TD stretching ratio of about 2 to about 10 times its initial length, and an MD stretching ratio of about 1 to about 1.1 times its initial length. As used herein, the expression "MD stretching ratio of about 1 to about 1.1" means that, upon film stretching, the film is stretched while moving the film in the MD and there is no additional stretching of the film (excluding inevitable stretching due to mechanical movement of the film). For example, a stretching ratio of about 1 indicates a non-stretched state of the film. Within these stretching ratio ranges, the polyester film provides low phase difference, thereby preventing (or reducing) the occurrence of certain problems, such as the generation of rainbow spots when used in liquid crystal displays, and tearing of the polyester film due to deterioration in the physical properties during stretching. For example, the polyester film may have a TD stretching ratio of about 3 to about 8 times its initial length.

Stretching may be performed by at least one of dry stretching and wet stretching, and the stretching temperature may range from about (Tg−20)° C. to about (Tg+50)° C., where Tg is the glass transition temperature of the polyester resin. For example, the stretching temperature may be about 70° C. to about 150° C., for example about 80° C. to about 130° C., or about 90° C. to about 120° C. Within any of these ranges, it is possible to suppress shrinkage and twisting of the polyester film after attachment to the polarizer.

Then, the stretched polyester film may be subjected to thermal stabilization for tension-relaxation, thereby fabricating a polyester film. A polyester film stretched to a high stretching ratio tends to return to its original state, but the thermal stabilization process controls the stress with respect to restoration of the polyester film, thereby maintaining thermal stabilization of the film.

The thermal stabilization process may include heating the stretched polyester film while moving the stretched polyester film in the MD with both ends of the stretched polyester film secured in the TD. In TD stretching, the polyester film is stretched to a lower stretching ratio than in the stretching process, and has a TD stretching ratio of greater than about 0 to about 3 or fewer times the initial length, for example about 0.1 to about 2 times the initial length, or about 0.1 to about 1 time the initial length. The film may be secured in the TD to prevent (or reduce the occurrence of) restoration of the film due to stretching to a high stretching ratio, and securing the film in the TD does not substantially stretch the polyester film in the TD.

During the thermal stabilization process, heating may be performed at a temperature of about 100° C. to about 300° C. for about 1 second to about 2 hours. Within these ranges, it is possible to suppress shrinkage and twisting of the polyester film after it is attached to the polarizer.

Although not shown in FIG. 1, the polyester film 140 may include a functional layer formed on the other surface thereof, that is, on a surface of the polyester film that does not adjoin the polarizer 130. The functional layer may include a hard coating layer, an anti-reflection layer, or an anti-fingerprint layer. The functional layer may have a thickness of about 1 μm to about 10 μm. When the functional layer has thickness within this range, the polyester film 140 can be applied to the polarizing plate when stacked on the polarizer.

In addition, although not shown in FIG. 1, the polyester film 140 may further include a surface coating layer on the surface thereof adjoining the polarizer 130. The polyester film has a hydrophobic surface, and polyethylene terephthalate exhibits high hydrophobicity when used as a protective film. In order to use such a polyester film in the polarizing plate, surface modification of the polyester film may be desired to convert the hydrophobic surface into a hydrophilic surface. Surface modification using sodium hydroxide (such as that used in a certain cellulose-based films) can provide insufficient modification or can damage the surface of the film. Thus, a surface coating layer including a bi-adhesive primer having hydrophobic and hydrophilic functional groups may be formed on the protective film. The bi-adhesive primer having hydrophobic and hydrophilic functional groups may include polyester resins, polyvinyl acetate resins, and combinations thereof, but is not limited thereto. The surface coating layer improves the mechanical properties and moisture permeability of the protective film, imparting the polarizing plate with high resistance to severe external conditions. Further, the surface coating layer may be formed between the protective film and the polarizing plate to improve adhesion between the protective film and the polarizer.

The optical film 150 is stacked on one surface of the LCD panel via adhesives for polarizing plates, and has a retardation value in a specified range in order to compensate for viewing angle. In one embodiment, the optical film may have an in-plane retardation (Ro) at a wavelength of 550 nm of about 100 nm or lower, for example about 20 nm to about 100 nm, or about 30 nm to about 80 nm. The optical film may have a thickness direction retardation (Rth) at a wavelength of 550 nm of about 50 nm or greater, for example, about 50 nm to about 300 nm. Within these ranges for the in-plane retardation (Ro) and thickness direction retardation (Rth), the optical film can provide an enlarged viewing angle through compensation for birefringence occurring in the liquid crystal cell upon transmission of light through liquid crystals, and can provide black and white compensation. Further, in VA mode, the optical film can enlarge the viewing angle.

The optical film 150 may be a transparent optical film formed of a polyester film or a non-polyester film. For example, the optical film may be formed of at least one of a cellulose (including triacetyl cellulose and/or the like), a polyester (including polyethylene terephthalate, polybutylene terephthalate, polyethylene naphthalate, polybutylene naphthalate and/or the like), a cyclic polyolefin, a polycarbonate, a polyethersulfone, a polysulfone, a polyamide, a polyimide, a polyolefin, a polyarylate, a polyvinyl alcohol, a polyvinyl chloride, and/or a polyvinylidene chloride resin. The optical film 150 may have a thickness of about 10 μm to about 500 μm. Within this range, the optical film can be used in a polarizing plate for LCDs.

Although the LCD panel may include the same kind of optical film on the upper and lower surfaces thereof (with reference to FIG. 1), it should be understood that the optical films may have different thicknesses, be made of different kinds of resins, and have different retardation values from those of the optical film described above.

<Adhesive Layer for Polarizing Plates>

Although not shown in FIG. 1, the polarizer 130 and the polyester film 140, or the polarizer 130 and the optical film 150, may be bonded to each other via an adhesive layer for polarizing plates. The adhesive layer for polarizing plates may be formed of a bonding agent composition for polarizing plates. The bonding agent composition for polarizing plates may include: (A) an epoxy compound; (B) a (meth)acrylic compound; at least one alkoxysilane compound having (C) an epoxy group-containing alkoxysilane compound and/or (D) a (meth)acrylate group-containing alkoxysilane compound; (E) a photosensitizer; and (F) a photocationic polymerization initiator. However, the bonding agent composition is not limited thereto.

(A) Epoxy Compound

The epoxy compound may have a high glass transition temperature (Tg) to impart durability to the adhesive layer by supporting the structure of the adhesive layer, which may be a cured product. In addition, the epoxy compound provides interfacial adhesion between the polarizer and the protective film through good wettability and chemical bonding via the hydroxyl group generated upon curing. In some embodiments, the epoxy compound may have a glass transition temperature (Tg) of about 50° C. to about 250° C., for example about 100° C. to about 200° C. Within these ranges, the epoxy compound can improve the durability of the polarizing plate and provide interfacial adhesion between the polarizer and the protective film.

The epoxy compound may include a non-silicon epoxy compound (i.e., free, or substantially free of silicon (Si)), a non-silane epoxy compound (i.e., free, or substantially free of silane groups), or a non-alkoxysilane epoxy compound (i.e., free, or substantially free of alkoxysilane groups). The epoxy compound may include an epoxy cationic compound. In some embodiments, the epoxy cationic compound may include at least one of an alicyclic epoxy, an aromatic epoxy, an aliphatic epoxy, and/or a hydrogenated epoxy compound.

The alicyclic epoxy compound may be a compound in which an alicyclic ring has at least one epoxy group. For example, the alicyclic epoxy compound may include alicyclic diepoxy carboxylate. In some embodiments, the alicyclic epoxy compound may include 3,4-epoxycyclohexylmethyl-3',4'-epoxycyclohexanecarboxylate, 2-(3,4-epoxycyclohexyl-5,5-spiro-3,4-epoxy)cyclohexane-methdioxane, bis(3,4-epoxycyclohexylmethyl)adipate, bis(3,4-epoxy-6-methylcyclohexyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexanecarboxylate, methylenebis(3,4-epoxycyclohexane), di(3,4-epoxycyclohexylmethyl)ether of ethylene glycol, ethylenebis(3,4-epoxycyclohexanecarboxylate), dioctylepoxycyclohexahydrophthalate, di-2-ethylhexylepoxycyclohexahydrophthalate, and/or the like.

The aromatic epoxy compound may include at least one epoxy group-containing bisphenol A and/or F, phenol novolac, cresol novolac, bisphenol A-novolac, dichloropentadiene novolac, glycidyl ether of triphenylmethane, triglycidyl para-aminophenol, and/or tetraglycidyl methylene dianiline. However, the aromatic epoxy compound is not limited thereto.

The aliphatic epoxy compound may include: 1,4-butanediol diglycidyl ether, 1,6-hexanediol diglycidyl ether, neopentyl glycol diglycidyl ether, trimethylolpropane triglycidyl ether, polyethylene glycol diglycidyl ether, glycerin triglycidyl ether, polypropylene glycol diglycidyl ethers; a polyglycidyl ether of polyether polyol obtained by adding at least one alkylene oxide to an aliphatic polyhydric alcohol such as ethylene glycol, propylene glycol, glycerin and/or the like; a diglycidylester of an aliphatic long-chain dibasic acid; a monoglycidyl ether of an aliphatic higher alcohol; a glycidyl ether of a higher fatty acid; epoxidized soybean oil; butyl epoxy stearate; octyl epoxy stearate; epoxidized linseed oil; and/or epoxidized polybutadiene. However, the aliphatic epoxy compound is not limited thereto.

The hydrogenated epoxy compound refers to a resin obtained by selectively hydrogenating an aromatic epoxy resin in the presence of a catalyst under pressure. Nonlimiting examples of the aromatic epoxy resin may include: bisphenol type epoxy resins such as diglycidyl ethers of bisphenol A, diglycidyl ethers of bisphenol F, diglycidyl ethers of bisphenol S, and/or the like; novolac type epoxy resins such as phenol novolac epoxy resins, cresol novolac epoxy resins, and hydroxybenzaldehyde phenol novolac epoxy resins; polyfunctional epoxy resins, such as glycidyl ethers of tetrahydroxyphenylmethane, glycidyl ethers of tetrahydroxybenzophenone, and/or epoxidized polyvinyl phenols, and/or the like. Although hydrogenated products of these aromatic epoxy resins are hydrogenated epoxy resins, in some embodiments, the hydrogenated epoxy compound may be a hydrogenated glycidyl ether of bisphenol A.

The epoxy compound may be present in an amount of about 1 to about 90 parts by weight, for example, about 40 to about 90 parts by weight, or about 45 to about 60 parts by weight, based on 100 parts by weight of (A)+(B)+(C)+(D). Within these ranges, the adhesive composition can exhibit good adhesion between the polarizer and the protective film, and deteriorations in wettability to the polarizer due to excessive increases in viscosity of the bonding agent composition may be prevented or reduced. In addition, breakdown of the adhesive layer due to excessive increases in storage modulus may be prevented or reduced. Further, the adhesive layer exhibits good crack resistance and cuttability.

(B) (Meth)Acrylic Compound

The (meth)acrylic compound may include a non-silicon (meth)acrylic compound (i.e., free, or substantially free of silicon (Si)), a non-silane (meth)acrylic compound (i.e., free, or substantially free of silane groups), or a non-alkoxysilane (meth)acrylic compound (i.e., free, or substantially free of alkoxysilane groups). As used herein, the term "substantially" is used as a term of approximation, and not as a term of degree, and is intended to account for inherent or standard deviations in the measurement or calculation of the amount of Si, silane or alkoxysilane groups in the (meth)acrylic compound.

The (meth)acrylic compound may include a radical curable (meth)acrylic compound, and may include at least one of (b1) a monofunctional (meth)acrylate and/or (b2) a polyfunctional (meth)acrylate. The "polyfunctional (meth)acrylate" may include at least two (meth)acrylates, for example two to six (meth)acrylates.

The (b2) polyfunctional (meth)acrylate may be present in an amount of greater than 0 wt % to about 20 wt % or less, for example, about 1 wt % to about 20 wt %, about 15 wt % to about 20 wt %, or about 19 wt % to about 20 wt % based on a total weight of (b1)+(b2). Within these ranges, deteriorations in adhesion of the adhesive composition due to curing shrinkage and be prevented or reduced.

The (b1) monofunctional (meth)acrylate may have at least one hydrophilic group to improve adhesion of the adhesive layer. The hydrophilic group may be a hydroxyl group or a carboxylic acid group. For example, the hydrophilic group may be a hydroxyl group.

The (b1) monofunctional (meth)acrylate may be a $C_1$ to $C_{20}$ alkyl group-containing monofunctional (meth)acrylate having at least one hydrophilic group, a $C_3$ to $C_{20}$ alicyclic group-containing monofunctional (meth)acrylate having at least one hydrophilic group, or a $C_6$ to $C_{20}$ aromatic group-containing monofunctional (meth)acrylate having at least one hydrophilic group. In some embodiments, the (b1) monofunctional (meth)acrylate may include at least one of 2-hydroxyethyl(meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethylene glycol mono(meth)acrylate, 1,6-hexanediol mono(meth)acrylate, 2-hydroxy-3-phenyloxypropyl(meth)acrylate, 4-hydroxycyclopentyl(meth)acrylate, 2-hydroxy-3-phenyloxybutyl(meth)acrylate, and/or 4-hydroxycyclohexyl(meth)acrylate. However, the monofunctional (meth)acrylate is not limited thereto.

The (b2) polyfunctional (meth)acrylate can improve the cross-linking density of the radical cured product, and thus improves the reliability of the adhesive by improving the cohesive energy of the bonding agent. The (b2) polyfunctional (meth)acrylate may be a hydroxyl group or a carboxylic acid group, for example, a hydroxyl group. The (b2) polyfunctional (meth)acrylate may be a (meth)acrylate of polyhydric alcohol having at least two hydroxyl groups, for example, two to six hydroxyl groups. In some embodiments, the (b2) polyfunctional (meth)acrylate may include trimethylolpropane tri(meth)acrylate, trimethylolpropane trioxyethyl(meth)acrylate, tris(2-acryloxyethyl) isocyanurate, pentaerythritol tri(meth)acrylate, and/or a mixture thereof.

The (meth)acrylic compound may be present in an amount of about 9 to about 90 parts by weight, for example, about 10 to about 90 parts by weight, about 20 to about 60 parts by weight, about 38 to about 50 parts by weight, or about 40 to about 50 parts by weight, based on 100 parts by weight of (A)+(B)+(C)+(D). Within these ranges, deteriorations in adhesion due to deteriorations in cohesion can be prevented or reduced, and the generation of tack caused by deteriorations in interfacial adhesion and storage modulus may be prevented or reduced. Accordingly, deteriorations in the reliability of the polarizing plate can be prevented or reduced, and the polarizing plate can exhibit good water resistance by preventing or reducing decolorization of the polarizer upon immersion in hot water.

(C) and (D) Alkoxysilane Compound

The bonding agent composition for polarizing plates can include either one of the epoxy compound and the (meth)acrylic compound, or a mixture thereof. When a mixture of the epoxy compound and the (meth)acrylic compound is used, the bonding agent composition can exhibit improved cohesion due to the mutual physical molecular chain twist between the epoxy and (meth)acrylic compounds, and the chemical bonding by chain transfer of the hydroxyl group included in the epoxy compound and the (meth)acrylic compound. However, although the adhesive composition can maintain adhesion due to this cohesion under general humidity conditions (60° C., 90% RH), the adhesive composition can suffer deteriorations in adhesion under more severe humidity conditions (for example, water immersion), leading to separation of the protective film from the polarizer.

The alkoxysilane compound forms a Si—O—Si bond through the condensation of silanols (Si—OH) generated upon the separation of an alkoxy group by reaction of the alkoxysilane compound with external moisture. As such, the bonding agent composition can exhibit improved adhesion even when the polarizing plate including the adhesive composition is subjected to severe humidity conditions. Since the alkoxysilane compound significantly improves cohesion of the bonding agent composition (or the adhesive layer) even under severe conditions (such as water immersion) causing an inflow of large amounts of water, the alkoxysilane compound can improve adhesion of the polarizing plate even under high humidity conditions. In addition, since the alkoxysilane compound includes at least one of an epoxy group and a (meth)acrylate group, the alkoxysilane compound can further improve cohesion or adhesion of the bonding agent composition for polarizing plates (or the adhesive layer) through the curing reaction with the epoxy compound or the (meth)acrylic compound.

The alkoxysilane compound may include a compound having at least one of silicon (Si), an epoxy group and/or a (meth)acrylate group, to which at least one alkoxy group is bonded.

In some embodiments, the alkoxysilane compound includes (C) at least one epoxy group-containing alkoxysilane compound represented by Formula 1.

(1)

In Formula 1, $R_1$, $R_2$ and $R_3$ are each independently a hydrogen atom, a $C_1$ to $C_5$ alkyl group, a $C_1$ to $C_5$ alkoxy group, a $C_5$ to $C_{10}$ cycloalkyl group, or a $C_6$ to $C_{10}$ aryl group. At least one of $R_1$, $R_2$ and $R_3$ is a $C_1$ to $C_5$ alkoxy group. X is a $C_1$ to $C_{10}$ aliphatic hydrocarbon group or a $C_6$ to $C_{20}$ aromatic hydrocarbon group. Y is a glycidoxy group, a glycidoxy group-containing $C_1$ to $C_{10}$ aliphatic hydrocarbon group, or an epoxy group-containing $C_5$ to $C_{10}$ alicyclic group. m is an integer from 1 to 3.

For example, $R_1$, $R_2$, $R_3$ may each independently be a $C_1$ to $C_5$ alkoxy group, X may be a $C_1$ to $C_{10}$ alkyl group or a $C_1$ to $C_{10}$ alkylene group, and Y may be a glycidoxy group, an epoxycyclopentyl group or an epoxycyclohexyl group. For example, the (C) epoxy group-containing alkoxysilane compound may include at least one of 3-glycidoxypropyltrimethoxysilane and/or [2-(3,4-epoxycyclohexyl)ethyl]trimethoxysilane, but is not limited thereto.

In some embodiments, the alkoxysilane compound includes (D) a (meth)acrylate group-containing alkoxysilane compound represented by Formula 2.

(2)

In Formula 2, $R_4$, $R_5$ and $R_6$ are each independently a hydrogen atom, a $C_1$ to $C_5$ alkyl group, a $C_1$ to $C_5$ alkoxy group, a $C_5$ to $C_{10}$ cycloalkyl group, or a $C_6$ to $C_{10}$ aryl group. At least one of $R_4$, $R_5$ and $R_6$ is a $C_1$ to $C_5$ alkoxy group. Z is a $C_1$ to $C_{10}$ aliphatic hydrocarbon group or a $C_6$ to $C_{20}$ aromatic hydrocarbon group. W is an acrylate group or a methacrylate group. n is an integer from 1 to 3.

For example, $R_4$, $R_5$ and $R_6$ may each independently be a $C_1$ to $C_5$ alkoxy group, and Z may be a $C_1$ to $C_5$ alkyl group or a $C_1$ to $C_5$ alkylene group. For example, the (D) (meth)acrylate group-containing alkoxysilane compound may include at least one of 3-(meth)acryloxypropyltrimethoxysilane and/or 3-(meth)acryloxypropyltriethoxysilane.

In the bonding agent composition, the (C) epoxy group-containing alkoxysilane compound may be optionally present in an amount of about 5 parts by weight or less, for example, about 0.1 to about 5 parts by weight, or about 0.1 to about 3 parts by weight, based on 100 parts by weight of (A)+(B)+(C)+(D) in terms of solids content. Within these ranges, the adhesive composition can exhibit improved durability upon reaction with external moisture through suitable copolymerization without deterioration (or with reduced or minimal deterioration) in the total degree of curing of (A).

In the bonding agent composition, the (D) (meth)acrylate group-containing alkoxysilane compound may be optionally present in an amount of about 5 parts by weight or less, for example, about 0.1 to about 5 parts by weight, or about 0.1 to about 3 parts by weight, based on 100 parts by weight of (A)+(B)+(C)+(D) in terms of solids content. Within these ranges, the adhesive composition can exhibit improved durability upon reaction with external moisture through suitable copolymerization without deterioration (or reduced or minimal deterioration) in the total degree of curing of (B).

The alkoxysilane compound may be present in an amount of about 0.01 wt % to about 12 wt %, for example, about 0.1 wt % to about 6 wt %, in the bonding agent composition in terms of solids content. Within these ranges, the adhesive composition can exhibit good adhesion under humid conditions and does not suffer from (or suffers from a reduced amount of) deteriorations in adhesion and reliability due to deteriorations in the degree of curing.

In some embodiments, the bonding agent composition for polarizing plates includes both (A) and (C), which contain an epoxy group, and both (B) and (D), which contain a (meth)acrylate group, thereby realizing an adhesive layer exhibiting good moisture resistance in wet environments, such as high humidity, water immersion, and the like. In addition, the adhesive composition may have a weight ratio of (A)/(C) of about 15 to about 500, for example, about 50 to about 500, and a weight ratio of (B)/(D) of about 15 to about 500, for example, about 50 to about 500. Within these ranges, the adhesive layer can exhibit good moisture resistance in wet environments, such as high humidity, water immersion and the like.

In the bonding agent composition for polarizing plates, (C)+(D), that is, the (C) epoxy group-containing alkoxysilane compound and the (D) (meth)acrylate group-containing alkoxysilane compound, may be present in an amount of about 0.01 wt % to about 10 wt %, for example, about 0.1 wt % to about 10 wt %, or about 0.2 wt % to about 6 wt, based on the total weight of (A)+(B)+(C)+(D). Within these ranges, the adhesive composition can have minimum influence on the function of the main material of each curing system, and can exhibit improved water resistance by suitably increasing the degree of crosslinking through reaction with external moisture.

The bonding agent composition may have a weight ratio of (C):(D) of about 1:0.5 to about 1:2, for example, about 1:0.5 to about 1:1. Within these ranges, the adhesive composition can exhibit effectively improved durability through suitable crosslinking.

(E) Photosensitizer

The photosensitizer catalyzes the curing reaction by generating a small amount of radicals, and serves as a catalyst for a photoacid generator. The photosensitizer may include thioxanthone, phosphorus, triazine, acetophenone, benzophenone, benzoin, oxime photosensitizers, and/or a mixture thereof.

The photosensitizer may be present in an amount of about 0.1 parts by weight to about 10 parts by weight, for example, about 0.5 parts by weight to about 6.0 parts by weight, based on 100 parts by weight of (A)+(B)+(C)+(D). Within these ranges, the photosensitizer allows sufficient curing of the (meth)acrylic compound, and can improve reactivity of the photoacid generator at a light intensity according to the selected process conditions.

(F) Photoacid Generator

The photoacid generator is a photocationic initiator and may include any suitable photocationic initiator capable of performing the photocuring reaction.

The photoacid generator may include an onium cation and an anion to form an onium salt. Examples of the onium cation may include diaryliodoniums such as diphenyliodonium, 4-methoxydiphenyliodonium, bis(4-methylphenyl)iodonium, bis(4-tert-butylphenyl)iodonium, bis(dodecylphenyl)iodonium and the like, triarylsulfonium such as triphenylsulfonium, diphenyl-4-thiophenoxyphenylsulfonium and/or the like, bis[4-(diphenylsulfonio)-phenyl]sulfide, bis[4-(di(4-(2-hydroxyethyl)phenyl)sulfonio)-phenyl]sulfide, 5-2,4-(cyclopentadienyl)[1,2,3,4,5,6-η]-(methylethyl)-benzeneFiron (1+), and/or the like. Examples of the anion may include hexafluorophosphate ($PF_6^-$), tetrafluoroborate ($BF_4^-$) hexafluoroantimonate ($SbF_6^-$), hexafluoroarsenate ($AsF_6^-$), hexachloroantimonate ($SbCl_6^-$), and/or the like.

The photoacid generator may be present in an amount of about 0.1 to about 10 parts by weight, for example, about 0.1 to about 6 parts by weight, based on 100 parts by weight of (A)+(B)+(C)+(D). Within these ranges, the photoacid generator allows sufficient polymerization of the epoxy compound, and can prevent (or reduce the amount of) residual initiator.

The bonding agent composition for polarizing plates may be prepared by mixing the epoxy compound, the (meth) acrylic compound, the alkoxysilane compound, the photosensitizer, and the photoacid generator.

The bonding agent composition for polarizing plates may include antioxidants, UV absorbents, ionic conductive agents, conductivity imparting agents (such as conductive metal oxide particles and/or the like), light diffusivity imparting agents, viscosity modifiers, and/or the like, so as not to deteriorate (or to reduce deteriorations in) the effects of embodiments of the present invention.

The adhesive layer for polarizing plates may have a thickness of about 1 μm to about 100 μm and may be formed by depositing the bonding agent composition for polarizing plates on one surface of the polyester film, followed by curing.

<Pressure Sensitive Adhesive Layer for Polarizing Plates>

Although not shown in FIG. 1, the polarizing plate 120 may be stacked on the LCD panel 110 via a pressure sensitive adhesive layer for polarizing plates. The pressure sensitive adhesive layer for polarizing plates may be formed of the composition for polarizing plates, which includes a (meth)acrylic copolymer, a curing agent, and a silane coupling agent.

The (meth)acrylic copolymer is a main component of the pressure sensitive adhesive layer for polarizing plates, and may be prepared using a monomer mixture that includes about 92 wt % to about 99.7 wt % of a (meth)acrylic acid ester monomer; and about 0.3 wt % to about 8 wt % of one of a carboxylic acid group containing monomer and a hydroxyl group-containing (meth)acrylic acid monomer. The (meth)acrylic copolymer has a weight average molecular weight of about 500,000 g/mol to about 2,000,000 g/mol.

The (meth)acrylic acid ester monomer does not contain a carboxylic acid group and a hydroxyl group, and may include at least one of a substituted or unsubstituted $C_1$ to $C_{30}$ alkyl group-containing (meth)acrylate, a substituted or unsubstituted $C_3$ to $C_{30}$ alicyclic group-containing (meth) acrylate, and/or a substituted or unsubstituted $C_6$ to $C_{20}$ aromatic group-containing (meth)acrylate. In the expression "substituted or unsubstituted," "substituted" means that at least one hydrogen atom is substituted with a $C_1$ to $C_{10}$ alkyl group, a $C_1$ to $C_{10}$ alkoxy group, a $C_6$ to $C_{20}$ aryloxy group, or a halogen atom.

For example, the (meth)acrylic acid ester monomer may include at least one of methyl(meth)acrylate, ethyl(meth) acrylate, propyl(meth)acrylate, isopropyl(meth)acrylate, n-butyl(meth)acrylate, isobutyl(meth)acrylate, tert-butyl (meth)acrylate, isoamyl(meth)acrylate, n-hexyl(meth)acrylate, n-heptyl(meth)acrylate, n-octyl(meth)acrylate, tert-octyl(meth)acrylate, 2-ethyl hexyl(meth)acrylate, decyl(meth) acrylate, isodecyl(meth)acrylate, tridecyl(meth)acrylate, stearyl(meth)acrylate, isostearyl(meth)acrylate, phenyl (meth)acrylate, benzyl(meth)acrylate, dodecyl(meth)acrylate, tetrahydrofurfuryl(meth)acrylate, cyclohexyl(meth) acrylate, 4-n-butylcyclohexyl(meth)acrylate, 2-ethylhexyl diglycol(meth)acrylate, butoxyethyl(meth)acrylate, butoxymethyl(meth)acrylate, 3-methoxybutyl(meth)acrylate, 2-(2-methoxyethoxy)ethyl(meth)acrylate, 2-(2-butoxyethoxy)ethyl(meth)acrylate, 4-butylphenyl(meth)acrylate, phenyl(meth)acrylate, 2,4,5-tetramethyl phenyl(meth)acrylate, phenoxymethyl(meth)acrylate, phenoxyethyl(meth) acrylate, polyethylene oxide monoalkylether(meth)acrylate, polyethylene oxide monoalkylether(meth)acrylate, polypropylene oxide monoalkylether(meth)acrylate, trifluoroethyl (meth)acrylate, pentadecafluorooxyethyl(meth)acrylate, 2-chloroethyl(meth)acrylate, 2,3-dibromopropyl(meth)acrylate, and/or tribromophenyl(meth)acrylate. A single one of these compounds may be used, or a combination of these compounds may be used.

The (meth)acrylic acid ester monomer may be present in the monomer mixture in an amount of about 92 wt % to about 99.7 wt %, for example, about 94 wt % to about 99.5 wt %, for example, about 96 wt % to about 99 wt %.

The carboxyl acid group containing monomer may include an unsaturated monomer having at least one carboxylic acid group in its molecular structure. Examples of the carboxylic acid group containing monomer may include (meth)acrylic acid, maleic acid, fumaric acid, crotonic acid, itaconic acid, myristoleic acid, palmitoleic acid, and/or oleic acid. A single one of these monomers may be used, or a combination of these monomers may be used.

The hydroxyl group-containing (meth)acrylic acid monomer may include a (meth)acrylic monomer having a hydroxyl group in its molecular structure. In some embodiments, the hydroxyl group-containing (meth)acrylic acid monomer may be a $C_1$ to $C_{20}$ alkyl group containing (meth) acrylic acid ester having at least one hydroxyl group or a $C_4$ to $C_{20}$ alicyclic group containing a (meth)acrylic acid ester having at least one hydroxyl group. Examples of the hydroxyl group-containing (meth)acrylic acid monomer may include 2-hydroxyethyl(meth)acrylate, 4-hydroxybutyl (meth)acrylate, 1,6-hexanediol mono(meth)acrylate, pentaerythritol tri(meth)acrylate, dipentaerythritol penta(meth) acrylate, neopentylglycol mono(meth)acrylate, trimethylolpropane di(meth)acrylate, trimethylolethane di(meth)acrylate, 2-hydroxypropyl(meth)acrylate, 2-hydroxybutyl(meth)acrylate, 2-hydroxy-3-phenyloxypropyl (meth)acrylate, 4-hydroxycyclohexyl(meth)acrylate, and/or cyclohexane dimethanol mono(meth)acrylate. Further, the hydroxyl group-containing (meth)acrylic acid monomer may include a compound obtained by the addition reaction of a glycidyl group containing compound, such as alkyl glycidyl ether, allyl glycidyl ether, and/or glycidyl(meth) acrylate, with (meth)acrylic acid.

At least one of the carboxylic acid group-containing monomer and/or the hydroxyl group-containing (meth) acrylic acid monomer may be present in the monomer mixture in an amount of about 0.3 wt % to about 8 wt %, for example, about 0.5 wt % to about 6 wt %, or about 1 wt % to about 4 wt %. Within these ranges, suitable crosslinks are formed by reaction of the hydroxyl group and the carbodiimide curing agent, thereby providing good heat resistance, flexibility and durability.

The (meth)acrylic copolymer may be prepared by any suitable method, for example, solution polymerization, emulsion polymerization, suspension polymerization, reverse-phase suspension polymerization, thin-film polymerization, and spray polymerization, which use polymerization initiators. However, the (meth)acrylic copolymer is not limited thereto.

The curing agent may include a carbodiimide curing agent. The carbodiimide curing agent reacts with, and is coupled to, a hydroxyl group and/or a carboxyl group of the (meth)acrylic copolymer, thereby forming a crosslinked structure. The polarizing plate is susceptible to deformation (such as expansion or shrinkage) due to environmental changes (such as changes in the surrounding temperature and the like). The pressure sensitive adhesive layer (formed of the pressure sensitive adhesive composition according to embodiments of the invention) includes the carbodiimide curing agent, and therefore the pressure sensitive adhesive layer can flex and adjust to the deformation of the polarizing plate, thereby preventing (or reducing the occurrence of) detachment or peeling of the polarizing plate, and preventing (or reducing) foaming.

It is understood that these effects can be obtained because the crosslinks made by the carbodiimide curing agent are arranged in a linear shape on the molecular chain of the carbodiimide, resulting in a crosslinked structure having high flexibility, thereby making it difficult to concentrate stress in the pressure sensitive adhesive layer upon expansion or shrinkage of the polarizing plate. By formation of such a crosslinked structure having high flexibility, a (meth)acrylic copolymer having a relatively low molecular weight can be used, and even when the content of the carbodiimide curing agent is increased to increase the degree of crosslinking, detachment or peeling of the polarizing plate can be prevented (or reduced), and foaming of the pressure sensitive adhesive layer can be prevented (or reduced).

According to embodiments of the invention, the carbodiimide curing agent may include any suitable carbodiimide crosslinking agent, without limitation. For example, a compound having at least two carbodiimide groups (—N=C=N—) may be used, and any suitable polycarbodiimide may be used. For example, the carbodiimide curing agent may include a diisocyanate compound having two carbodiimide groups.

Further, the carbodiimide compound may include a high-molecular weight polycarbodiimide prepared by a decarbonation condensation reaction of a diisocyanate in the presence of a carbodiimide catalyst. Examples of such compounds may include compounds obtained by a decarbonation condensation reaction of the following diisocyanates.

Examples of the diisocyanates may include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethyl xylene diisocyanate. A single one of these compounds may be used, or a combination of these compounds may be used.

Examples of the carbodiimide catalyst may include phospholene oxides, such as 1-phenyl-2-phospholene-1-oxide, 3-methyl-2-phospholene-1-oxide, 1-ethyl-3-methyl-2-phospholene-1-oxide, 1-ethyl-2-phospholene-1-oxide, and 3-phospholene isomers thereof.

These high-molecular-weight polycarbodiimides may be synthesized, or may be obtained commercially. Commercially available products suitable for use as the carbodiimide curing agent may include CARBODILITE® (Nisshinbo Chemical Inc.), specifically CARBODILITE® V-01, V-03, V-05, V-07 and V09, which are compatible with organic solvents. For example, CARBODILITE® V-01, V-05, and V-07 may be used.

The carbodiimide curing agent may be added in an amount of about 0.01 to about 1.0 parts by weight based on 100 parts by weight of the (meth)acrylic copolymer. Within this range, the carbodiimide curing agent can form a suitable crosslinked structure, thereby providing further improved durability. For example, the carbodiimide curing agent may be added in an amount of about 0.02 to about 0.8 parts by weight.

As the silane coupling agent, an oligomeric silane coupling agent may be used.

The oligomeric silane coupling agent may be prepared by condensation of two or more silane compounds, each of which has at least one alkoxy group, to form a —Si—O—Si— structure. As a result of the condensation, a —Si—O—Si— structure is formed, in which at least one alkoxy group is bonded to one of the silicon atoms. The oligomeric silane coupling agent may have an organic functional group.

The oligomeric silane coupling agent plays a role in achieving a pressure sensitive adhesive layer having low tack. The presence of the alkoxy group allows the oligomeric silane coupling agent to exhibit good adhesion to the glass used in liquid crystal panels. In addition, the presence of the organic functional group allows the oligomeric silane coupling agent to be highly compatible with, and have good adhesion to, the (meth)acrylic copolymer, and allows the oligomeric silane coupling agent to exhibit the so-called "anchor effect" on the (meth)acrylic copolymer. Since the siloxane skeleton of the oligomer exhibits some flowability (plasticity), the resulting pressure sensitive adhesive layer is assumed to have low tack. The oligomeric silane coupling agent migrates to the surface of the pressure sensitive adhesive layer due to poor compatibility of the siloxane skeleton with the (meth)acrylic copolymer. As a result of this migration, the siloxane skeleton adheres to the glass to which the alkoxy group is bound, and the organic functional group exhibits the anchor effect on the (meth)acrylic copolymer. On the other hand, stress tends to be concentrated at the interface between the glass substrate and the pressure sensitive adhesive layer due to plasticity of the siloxane skeleton, resulting in peeling of the glass substrate from the pressure sensitive adhesive layer. This easy peeling is considered to be caused by the low tack of the pressure sensitive adhesive layer.

The low tack pressure sensitive adhesive layer may have a pressure sensitive adhesive strength of 5.0 N/25 mm or less. In a laminate of a liquid crystal panel and an optical film (the sizes of which have increased in recent years), because the pressure sensitive adhesive layer has a pressure sensitive adhesive strength of 5.0 N/25 mm or less, the liquid crystal panel and the optical film from are easily separated from each other in a subsequent process, thereby improving workability and productivity. There is no particular restriction as to the lower limit of the pressure sensitive adhesive strength. Given the function of the pressure sensitive adhesive composition as a pressure sensitive adhesive, the lower limit of the pressure sensitive adhesive strength is desirably 0.5 N/25 mm or greater. For example, the pressure sensitive adhesive layer may have a pressure sensitive adhesive strength of about 0.5 N/25 mm to about 5.0 N/25 mm, or about 0.15 N125 mm to about 4.8 N/25 mm. Herein, the pressure sensitive adhesive strength of the pressure sensitive adhesive layer is measured pursuant to the JIS Z0237 (2000) testing method for pressure sensitive adhesive tapes/pressure sensitive adhesive sheets. The measurement method of the pressure sensitive adhesive strength of the pressure sensitive adhesive layer is described in the examples, below.

Examples of the organic functional groups that can be included in the oligomeric silane coupling agent include vinyl, epoxy, styryl, (meth)acryloyl, methacryloyl, acryloxy, amino, ureido, chloropropyl, mercapto and polysulfide groups. In some embodiments, for example, the organic functional group may include epoxy, mercapto and/or (meth)acryloyl groups, which can impart improved durability and low tack to the pressure sensitive adhesive layer. In some embodiments, for example, the organic functional groups include epoxy and/or mercapto groups.

The oligomeric silane coupling agent may be one that has two silicon atoms (i.e. a dimer) to about 100 silicon atoms per molecule, that is, an average degree of polymerization of about 2 to about 100. With an increasing average degree of polymerization, the oligomeric silane coupling agent becomes viscous and can take the form of a paste or solid, which is difficult to handle due to high viscosity. Therefore, in some embodiments, the oligomeric silane coupling agent may have an average degree of polymerization of about 2 to about 80, for example, about 3 to about 50.

The organic functional group included in the oligomeric silane coupling agent may be bonded to silicon via an appropriate linker. Examples of such linkers include: alkylene groups, such as methylene, ethylene, trimethylene, hexamethylene and decamethylene; divalent hydrocarbon groups interrupted by at least one aromatic ring, such as methylphenylethyl; and divalent aliphatic groups interrupted by at least one oxygen atom, such as methoxymethyl, methoxyethyl and methoxypropyl. When the organic functional group is an epoxy group, a functional group may be formed between the two adjacent carbon atoms that are bonded together to form a ring.

Hereinafter, description will be given of an exemplary oligomeric silane coupling agent having an epoxy, mercapto or (meth)acryloyl group as the organic functional group. In the oligomeric silane coupling agent, for example, "an organic group having a mercapto group" is defined as a group in which the mercapto group is bonded to the silicon atom via the linker. Similarly, "an organic group having an epoxy group" is defined as a group in which the epoxy group is bonded to the silicon atom via the linker. Also, "an organic group having a (meth)acryloyloxy group" is defined as a group in which the (meth)acryloyloxy group is bonded to the silicon atom via the linker.

Examples of organic groups having a mercapto group include mercaptomethyl, 3-mercaptopropyl, 6-mercaptohexyl, 10-mercaptodecyl and 2-(4-mercaptomethylphenyl) ethyl groups. Examples of organic groups having an epoxy group include glycidoxymethyl, 3-glycidoxypropyl and 2-(3,4-epoxycyclohexyl)ethyl groups. Examples of organic groups having a (meth)acryloyloxy group include acryloyloxymethyl, 3-acryloyloxypropyl, methacryloyloxymethyl and 3-methacryloyloxypropyl groups.

The oligomeric silane coupling agent may be a cooligomer obtained by partial co-hydrolysis and polycondensation of a tetraalkoxysilane compound and a silane compound represented by Formula 3.

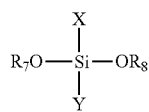

(3)

In Formula 3, $R_7$ and $R_8$ are each independently an alkyl or phenyl group, X is an organic group having a functional group selected from mercapto, epoxy and (meth)acryloyloxy groups, and Y is an alkyl, alkoxy, phenyl, phenoxy, aralkyl or aralkyloxy group.

In some embodiments, for example, $R_7$ and $R_8$ in Formula 3 may each independently be a $C_1$ to $C_{10}$ alkyl group. For example, in some embodiments, $R_7$ and $R_8$ may each independently be a methyl or ethyl group.

Examples of the organic functional group represented by X in Formula 3 are the same as those described previously. Examples of organic groups having a mercapto group include mercaptomethyl, 3-mercaptopropyl, 6-mercaptohexyl, 10-mercaptodecyl and 2-(4-mercaptomethylphenyl) ethyl groups. Examples of organic groups having an epoxy group include glycidoxymethyl, 3-glycidoxypropyl and 2-(3,4-epoxycyclohexyl)ethyl groups. Examples of organic groups having a (meth)acryloyloxy group include acryloyloxymethyl, 3-acryloyloxypropyl, methacryloyloxymethyl and 3-methacryloyloxypropyl groups.

In some embodiments, Y in Formula 3 may be a $C_1$ to $C_{10}$ alkyl or alkoxy group, or a $C_7$ to $C_{10}$ aralkyl or aralkyloxy.

Examples of the functional group-containing silane compound represented by Formula 3 are described below. Examples of silane compounds in which X is an organic group having a mercapto group include mercaptomethyltrimethoxysilane, 3-mercaptopropyltrimethoxysilane, 3-mercaptopropyltriethoxysilane, 2-(4-mercaptomethylphenyl) ethyltrimethoxysilane, 6-mercaptohexyltrimethoxysilane, 10-mercaptodecyltrimethoxysilane, 3-mercaptopropylmethyldimethoxysilane, and 3-mercaptopropylmethyldiethoxysilane.

Examples of silane compounds in which X is an organic group having an epoxy group include glycidoxymethyltrimethoxysilane, 3-glycidoxypropyltrimethoxysilane, 2-(3,4-epoxycyclohexyl)ethyltrimethoxysilane, and 3-glycidoxypropylmethyldimethoxysilane.

Examples of silane compounds in which X is an organic group having a (meth)acryloyloxy group include acryloyloxymethyltrimethoxysilane, 3-acryloyloxypropyltrimethoxysilane, 3-acryloyloxypropyltriethoxysilane, methacryloyloxymethyltrimethoxysilane, 3-methacryloyloxypropyltrimethoxysilane, 3-methacryloyloxypropyltriethoxysilane, 3-methacryloyloxypropyltributoxysilane, 3-acryloyloxypropylmethyldimethoxysilane, 3-methacryloyloxypropylmethyldimethoxysilane, and 3-methacryloyloxypropylmethyldiethoxysilane.

In the tetraalkoxysilane (which is partially co-hydrolyzed and polycondensed with the functional group-containing silane compound represented by Formula 3), each of four alkoxy groups bonded to the silicon atom may have 1 to 10 carbon atoms. The four alkoxy groups bonded to the silicon atom may be the same or different. For ease of production and purchase, the same alkoxy groups may be bonded to the silicon atom. Nonlimiting examples of such silane compounds include tetramethoxysilane, tetraethoxysilane, tetrapropoxysilane, and tetrabutoxysilane.

The oligomeric silane coupling agent may be prepared by partial co-hydrolysis and polycondensation of the functional group-containing silane compound represented by Formula 3 and the tetraalkoxysilane. In this case, the alkoxysilyl or phenoxysilyl groups of —$OR_7$ and —$OR_8$ bonded to the silicon atom are partially hydrolyzed to form a silanol group, and the alkoxysilyl groups of the tetraalkoxysilane are partially hydrolyzed to form a silanol group. Condensation of the two silanol groups produces the oligomeric silane coupling agent. Use of such an oligomer tends to keep the pressure sensitive adhesive composition from scattering during coating and drying.

Nonlimiting examples of combinations of monomers suitable for the preparation of the oligomeric silane coupling agent include the following.

Nonlimiting examples of suitable mercaptomethyl group-containing cooligomers include mercaptomethyltrimethoxysilane-tetramethoxysilane cooligomers, mercaptomethyl trimethoxysilane-tetraethoxysilane cooligomers, mercaptomethyl triethoxysilane-tetramethoxysilane cooligomers, mercaptomethyl triethoxysilane-tetraethoxysilane cooligomers, and the like.

Nonlimiting examples of suitable mercaptopropyl group-containing cooligomers include 3-mercaptopropyltrinnethoxysilane-tetramethoxysilane cooligomers, 3-mercaptopropyltrimethoxysilane-tetraethoxysilane cooligomers, 3-mercaptopropyltriethoxysilane-tetramethoxysilane cooligomers, 3-mercaptopropyltriethoxysilane-tetraethoxysilane cooligomers, and the like.

Nonlimiting examples of suitable glycidoxymethyl group-containing cooligomers include glycidoxymethyl trimethoxysilane-tetramethoxysilane cooligomers, glycidoxymethyl trimethoxysilane-tetraethoxysilane cooligomers, glycidoxymethyl triethoxysilane-tetramethoxysilane cooligomers, glycidoxymethyl triethoxysilane-tetraethoxysilane cooligomers, and the like.

Nonlimiting examples of suitable glycidoxypropyl group-containing cooligomers include 3-glycidoxypropyltrimethoxysilane-tetramethoxysilane cooligomers, 3-glycidoxypropyltrimethoxysilane-tetraethoxysilane cooligomers, 3-glycidoxypropyltriethoxysilane-tetramethoxysilane cooligomers, 3-glycidoxypropyltriethoxysilane-tetraethoxysilane cooligomers, and the like.

Nonlimiting examples of suitable (meth)acryloyloxypropyl group-containing cooligomers include acryloyloxypropyl group-containing cooligomers, such as 3-acryloyloxypropyltrimethoxysilane-tetramethoxysilane cooligomers, 3-acryloyloxypropyltrimethoxysilane-tetraethoxysilane cooligomers, 3-acryloyloxypropyltriethoxysilane-tetramethoxysilane cooligomers, 3-acryloyloxypropyltriethoxysilane-tetraethoxysilane cooligomers, 3-acryloyloxypropylmethyl dimethoxysilane-tetramethoxysilane cooligomers, 3-acryloyloxypropylmethyl dimethoxysilane-tetraethoxysilane cooligomers, 3-acryloyloxypropylmethyl diethoxysilane-tetramethoxysilane cooligomers, 3-acryloyloxypropylmethyl diethoxysilane-tetraethoxysilane cooligomers, and methacryloyloxypropyl group-containing cooligomers such as 3-methacryloyloxypropyltrimethoxysilane-tetramethoxysilane cooligomers, 3-methacryloyloxypropyltrimethoxysilane-tetraethoxysilane cooligomers, 3-methacryloyloxypropyltriethoxysilane-tetramethoxysilane cooligomers, 3-methacryloyloxypropyltriethoxysilane-tetraethoxysilane cooligomers, 3-methacryloyloxypropylmethyl dimethoxysilane-tetramethoxysilane cooligomers, 3-methacryloyloxypropylmethyl dimethoxysilane-tetraethoxysilane cooligomers, 3-methacryloyloxypropylmethyl diethoxysilane-tetramethoxysilane cooligomers, 3-methacryloyloxypropylmethyl diethoxysilane-tetraethoxysilane cooligomers, and the like.

The oligomeric silane coupling agent may be synthesized or obtained commercially. Nonlimiting examples of suitable commercially available products suitable for use as the oligomeric silane coupling agent may include X-41-1805, X-41-1810, X-41-1053, and X-41-1058, all of which are trade names of Shin-Etsu Chemical Co. Ltd. X-41-1805 is a silicon oligomer having mercapto, methoxy and ethoxy groups. X-41-1810 is a silicon oligomer having mercapto, methyl and methoxy groups. X-41-1053 is a silicon oligomer having epoxy, methoxy and ethoxy groups. X-41-1058 is a silicon oligomer having epoxy, methyl and methoxy groups.

The oligomeric silane coupling agent may be present in an amount of 0.02 to 1 part by mass, based on 100 parts by weight of the (meth)acrylic copolymer. Within this range, the pressure sensitive adhesive composition can exhibit low tack and good durability. For example, the amount of the oligomeric silane coupling agent may be about 0.03 to about 0.9 parts by weight, or about 0.05 to about 0.8 parts by weight.

The pressure sensitive adhesive composition may include an isocyanate curing agent in addition to the carbodiimide curing agent. According to embodiments of the present invention, the carbodiimide curing agent may serve as the main component for forming the crosslinked structure, and the isocyanate curing agent is added as an assistive component. Thus, when the isocyanate curing agent is added, the pressure sensitive adhesive layer can exhibit improved crosslinking properties and adhesion.

According to embodiments of the invention, any suitable isocyanate curing agent may be used, without limitation. Nonlimiting examples of the isocyanate curing agent may include aromatic diisocyanates, such as triallyl isocyanate, dimeric acid diisocyanate, 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), tolidine diisocyanate (TODI), and 1,5-naphthalene diisocyanate (NDI); aliphatic diisocyanates, such as hexamethylene diisocyanate (HDI), trimethylhexamethylene diisocyanate (TMHDI), lysine diisocyanate, and norbornane diisocyanate methyl (NBDI); alicyclic isocyanates, such as trans-cyclohexane-1,4-diisocyanate, isophorone diisocyanate (IPDI), H6-XDI (hydrogen added XDI), and H12-MDI (hydrogen added MDI); carbodiimide-modified diisocyanates of the foregoing diisocyanates; and isocyanurate-modified diisocyanates thereof. In addition, adducts of these isocyanate compounds and polyol compounds, such as trimethylolpropane, or biurets or isocyanurates of the isocyanate compounds may be used.

The isocyanate curing agent may be synthesized or obtained commercially. Nonlimiting examples of commercially available products suitable for use as the isocyanate curing agent may include Coronate® L, Coronate® HL, Coronate® 2030, Coronate® 2031 (all available from Nippon Polyurethane Industry Co., Ltd.); Takenate® D-102, Takenate® 0-110N, Takenate® D-200, Takenate® D-202 (all available from Mitsui Chemicals Inc.); Duranate™ 24A-100, Duranate™ TPA-100, Duranate™ TKA-100, Duranate™ P301-75E, Duranate™ E402-90T, Duranate™ E405-80T, Duranate™ TSE-100, Duranate™ D-101, and Duranate™ D-201 (all available from Asahi Kasel Corporation); and the like.

In some embodiments, for example, the isocyanate curing agent may include Coronate® L, Coronate® HL, Takenate® D-110N, and/or Duranate™ 24A-100. For example, in some embodiments, Coronate® L and/or Takenate® D-110N may be used. In some embodiments, Coronate® L may be used. A single isocyanate curing agent may be used, or a combination of isocyanate curing agents may be used.

When the isocyanate curing agent is used, the isocyanate curing agent may be present in an amount of 0.05 to 3.8 parts by weight based on 100 parts by weight of the (meth)acrylic copolymer. Within this range, the degree of crosslinking may be easily adjusted together with the carbodiimide. For example, the amount of isocyanate curing agent may be 0.1 to 3 parts by weight, or 0.1 to 2.6 parts by weight.

The pressure sensitive adhesive layer for polarizing plates may have a thickness of about 1 μm to about 100 μm and may be formed by depositing the pressure sensitive adhesive composition for polarizing plates on one surface of the polyester film, followed by aging.

A liquid crystal display according to embodiments of the present invention may include the LCD module according to the embodiments of the invention, and a backlight unit.

Next, embodiments of the present invention will be described with reference to some examples. However, it is understood that these examples are provided for illustration only and are not to be construed in any way as limiting the embodiments of the present invention.

Example 1

(1) Manufacture of Polarizer

A polyvinyl alcohol film (polymerization degree: 2,400, saponification degree: 99%, thickness: 60 μm, VF-PS #6000, Kuraray Co., Ltd., Japan) was subjected to swelling in a swelling bath containing an aqueous solution at 30° C., stretching to a stretching ratio of 3.1 times the initial length at 30° C., iodine adsorption in a 0.02 wt % aqueous iodine solution, and stretching to a stretching ratio of 2 times the initial length in a boric acid solution at 57° C. to yield a final MD stretching ratio of 6.2, thereby manufacturing a polarizer (thickness: 23 μm).

(2) Preparation of Bonding Agent Composition for Polarizing Plates 49.9 parts by weight of bisphenol A aromatic epoxy (KDS-8128, Kukdo Chemical Co., Ltd), 49.9 parts by weight of 2-hydroxyethyl acrylate (100%, SK CYTEC), 0.1 parts by weight of 3-glycidoxypropyltrimethoxysilane, 0.1 parts by weight of 3-methacryloxy propyltrimethoxysilane (KBM-503, Shinetsu), 3 parts by weight of thioxanthone (DETX-S, Nippon Kayaku), and 1 part by weight of hexafluorophosphate Iodonium salt (Irgacure-250, Basf) were blended to prepare a bonding agent composition for polarizing plates.

(3) Preparation of Pressure Sensitive Adhesive Composition for Polarizing Plates 98 parts by weight of n-butyl acrylate (product of Nippon Shokubai Co., Ltd.), 2 parts by weight of acrylic acid (product of Nippon Shokubai Co., Ltd.), and 150 parts by weight of ethyl acetate were placed in a flask provided with a reflux condenser and a stirrer, followed by heating to 65° C. while performing nitrogen substitution. Next, 0.1 parts by weight of azobisisobutyronitrile (AIBN) was added to the mixture, which in turn was polymerized at 65° C. for 6 hours. After completing the polymerization, the resulting mixture was diluted with 83 parts by weight of ethyl acetate, thereby obtaining an acrylic copolymer solution. The acrylic copolymer solution had a solids content of 28.0 wt %, a viscosity of 5.0 Pa·s, and a weight average molecular weight of 600,000 g/mol. To the acrylic copolymer solution (including 100 parts by weight of an acrylic copolymer), 0.3 parts by weight of a carbodiimide curing agent CARBODILITE® V-07 (Nisshinbo Chemical Inc.), 0.3 parts by weight of an oligomeric silane coupling agent X-41-1053 (Shinetsu Chemical Co., Ltd.), and 1.5 parts by weight of an isocyanate curing agent Coronate L (trimethylolpropane/tolylene diisocyanate trimer adduct, Nippon Polyurethane Co., Ltd) were added, and the resultant was mixed at room temperature (25° C.) for 10 minutes, thereby preparing a solution in which an adhesive composition for polarizing plates was dissolved.

(4) Manufacture of Polarizing Plate

A polyethylene terephthalate (PET) film 1 as listed in Table 1 was bonded to an upper surface of the manufactured polarizer, and a TAC film (KC-4DR-1, thickness: 40 μm, Ro at 550 nm: 50.77 nm, Rth at 550 nm: 113.16 nm, Konica) was bonded to a lower surface of the manufactured polarizer using the bonding agent composition for polarizing plates, thereby fabricating a polarizing plate.

nx, ny, nz, NZ, and Ro of each of the PET film 1 and the TAC film were measured at a wavelength of 550 nm using a measurement instrument, AXOSCAN (AXOMetrics).

(5) Manufacture of LCD Module

The manufactured polarizing plate was bonded to each of the upper and lower surfaces of an LCD panel (LTA460HJ05, VA mode, Samsung Electronics) using the prepared adhesive composition for polarizing plates, thereby fabricating an LCD module having a PET film 1/polarizer/TAC filmNA mode LCD panel/TAC film/polarizer/PET film 1 structure.

Example 2

An LCD module was manufactured as in Example 1, except that PET films 2, as listed in Table 1, were used in the LCD panel instead of the PET films 1.

Comparative Example 1

An LCD module was manufactured as in Example 1, except that normal TAC films, as listed in Table 1, were used in the LCD panel instead of the PET films 1.

Comparative Example 2

An LCD module was manufactured as in Example 1, except that unstretched PET films, as listed in Table 1, were used in the LCD panel instead of the PET films 1.

TABLE 1

|  | PET film 1 | PET film 2 | Normal TAC film | Unstretched PET film |
|---|---|---|---|---|
| nx-ny | 0.084 | 0.090 | 0.000027 | 0.000243 |
| ny-nz | 0.065 | 0.06 | 0.000806 | 0.001381 |
| nx-nz | 0.149 | 0.154 | 0.000832 | 0.001624 |
| NZ | 1.77 | 1.71 | 30.84 | 6.68 |
| Ro (nm) | 6719 | 5405 | 1.08 | 48 |
| Thickness (μm) | 80 | 60 | 40 | 200 |

The components used in the Examples and Comparative Examples are described below.

PET film 1: PET film 1 was prepared by stretching a PET film (which was obtained by melt extrusion of a polyethylene terephthalate (PET) resin) to 5.9 times the initial length only in the TD without MD stretching while mechanically moving the PET film in the MD using rolls, followed by heating the stretched film at 100° C. while moving the film in the MD, with both ends of the film secured in the TD.

PET film 2: PET film 2 was prepared by stretching a PET film (which was obtained by melt extrusion of a polyethylene terephthalate (PET) resin) to 6.2 times the initial length only in the TD without MD stretching while mechanically moving the PET film in the MD using rolls, followed by heating the stretched film at 150° C. while moving the film in the MD, with both ends of the film secured in the TD.

Normal TAC film: KC-4UYW(T64), Konica, thickness: 40 μm, Ro at 550 nm: 1.08 nm, Rth at 550 nm: 32.76 nm non-stretched PET film: thickness: 200 μm, Ro at 550 nm: 48 nm, Mitsubishi Chemical Each of the LCD modules manufactured in the Examples and Comparative Examples was assembled with a backlight unit (LTA230HL04 BLU, Samsung Display Co., Ltd.). Then, Brightness (B) at a viewing angle of 0°/0°, Brightness (A) at a viewing angle of 45°/60°, and Brightness (C) at a viewing angle of 135°/60° were measured using a measurement instrument, SR-3A (Topcon). CR 45° and CR 135° were calculated using Equations 1 and 2. The results are shown in Table 2.

TABLE 2

|  | Example 1 | Example 2 | Comparative Example 1 | Comparative Example 2 |
|---|---|---|---|---|
| Polyester film | PET film 1 | PET film 2 | Normal TAC (KC-4UYW) | Unstretched PET |
| Optical film | TAC film (KC-4DR-1) | TAC film (KC-4DR-1) | TAC film (KC-4DR-1) | TAC film (KC-4DR-1) |
| Brightness B | 5996 | 6059 | 5954 | 5071 |
| Brightness A | 60 | 61 | 51 | 42 |
| Brightness C | 65 | 66 | 58 | 19 |
| CR 45° (%) | 1.00 | 1.01 | 0.86 | 0.83 |
| CR 135° (%) | 1.08 | 1.09 | 0.97 | 0.37 |
| \|C − A\| | 5 | 5 | 7 | 23 |
| \|CR135° − CR 45°\| (%) | 0.08 | 0.08 | 0.11 | 0.46 |

As shown in Table 2, the LCD modules according to embodiments of the present invention had improved lateral brightness at viewing angles of 45°/60° and 135°/60° corresponding to lateral sides of the LCD panel, and increased CR 45° and CR 135°, thereby improving the lateral viewing angle. In addition, the LCD modules according to embodiments of the present invention had a minimized difference in brightness between both sides of the LCD panel, thereby providing uniform brightness.

On the contrary, the LCD modules of Comparative Examples 1 and 2 (each of which included a film having a difference in the indices of refraction in the x-axis and z-axis directions (i.e., nx−nz) out of the range according to embodiments of the invention) had lower CR 45° and CR 135° values than those according to embodiments of the invention, thereby providing little to no improvement in the lateral viewing angle as compared with the embodiments of the present invention. Moreover, the LCD modules of Comparative Examples 1 and 2 exhibited a large difference in brightness between both sides of the LCD panel, thereby providing uneven brightness.

While certain exemplary embodiments of the present invention have been illustrated and described, those of ordinary skill in the art would understood that various modifications, changes and alterations can be made to the described embodiments without departing from the spirit and scope of the invention, as defined in the following claims.

What is claimed is:

1. A liquid crystal display (LCD) module comprising:
an LCD panel; and
a polarizing plate on each of upper and lower surfaces of the LCD panel, the polarizing plate comprising:
a polarizer, and
a polyester film on at least one surface of the polarizer, the polyester film having a difference between an index of refraction in an x-axis direction and an index of refraction in a z-axis direction (nx−nz) of about 0.1 to about 0.18, wherein nx and nz are the indices of refraction in the x-axis direction and z-axis direction, respectively, at a wavelength of 550 nm, and
the LCD module has a CR 45° and a CR 135° of about 1.0% to about 5.0%, as calculated by Equations 1 and 2, respectively:

$$CR\ 45°(\text{contrast ratio } 45°) = A/B \times 100 \quad (1)$$

wherein A is a brightness value measured at a viewing angle of 45°/60° with respect to the LCD module, and B is a brightness value measured at a viewing angle of 0°/0° with respect to the LCD module, $$CR\ 135°(\text{contrast ratio } 135°) = C/B \times 100 \quad (2)$$

wherein B is a brightness value measured at a viewing angle of 0°/0° with respect to the LCD module, and C is a brightness value measured at a viewing angle of 135°/60° with respect to the LCD module.

2. The LCD module according to claim 1, wherein the LCD panel comprises a liquid crystal layer including liquid crystals aligned in a vertical alignment (VA) mode.

3. The LCD module according to claim 1, wherein an absolute value (|C−A|) of a difference between C and A is about 5 or less.

4. The LCD module according to claim 1, wherein an absolute value (|CR 135°−CR 45°|) of a difference between CR 135° and CR 45° is about 0.1% or less.

5. The LCD module according to claim 1, wherein the polyester film has a difference in the index of refraction in the x-axis direction and an index of refraction in the y-axis direction (nx−ny) of about 0.01 to about 0.1, wherein nx and ny are the indices of refraction in the x-axis and y-axis directions, respectively, at a wavelength of 550 nm.

6. The LCD module according to claim 1, wherein the polyester film has a difference in the index of refraction in the y-axis direction and an index of refraction in the z-axis direction (ny−nz) of about 0.01 to about 0.1, wherein ny and nz are the indices of refraction in the y-axis and z-axis directions, respectively, at a wavelength of 550 nm.

7. The LCD module according to claim 1, wherein the polyester film has an in-plane retardation (Ro) at a wavelength of 550 nm of about 5,000 nm to about 15,000 nm.

8. The LCD module according to claim 1, wherein the polyester film has a degree of biaxiality (NZ) of about 1.8 or less, as calculated by Equation 3:

$$NZ = (nx-nz)/(nx-ny) \quad (3)$$

wherein nx, ny and nz are indices of refraction at a wavelength of about 550 nm in the x-axis, y-axis and z-axis directions, respectively, of the polyester film.

9. The LCD module according to claim 1, further comprising: an optical film formed on an other surface of the polarizer.

10. The LCD module according to claim 9, wherein the optical film has an in-plane retardation (Ro) at a wavelength of 550 nm of about 20 nm to about 100 nm.

11. The LCD module according to claim 9, wherein the optical film has a thickness direction retardation (Rth) at a wavelength of 550 nm of about 50 nm to about 300 nm, as calculated by Equation 4:

$$Rth = ((nx+ny)/2 - nz) \times d \quad (4)$$

wherein nx, ny and nz are indices of refraction at a wavelength of about 550 nm in the x-axis, y-axis and z-axis directions of the optical film, respectively, and d is a thickness of the optical film in nm.

12. A liquid crystal display comprising the LCD module according to claim 1.

* * * * *